Jan. 2, 1951 — C. A. THOMAS — 2,536,827
BRUSH MECHANISM
Filed Jan. 20, 1950
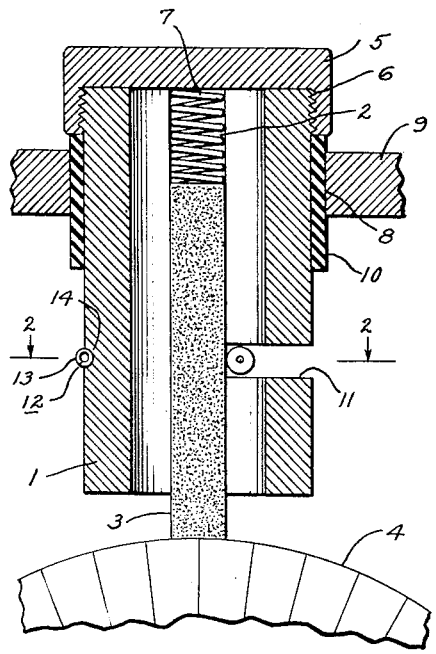
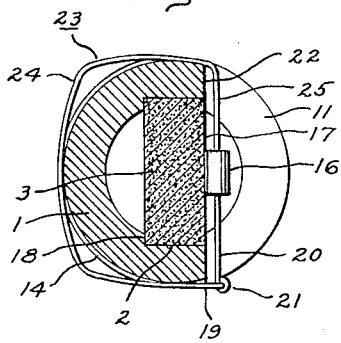
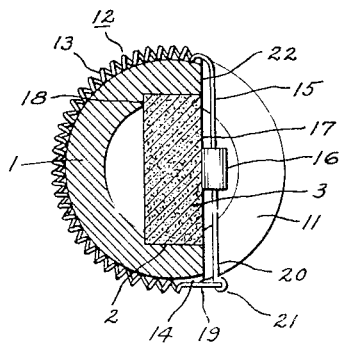
Inventor:
Charles A. Thomas,
by Ernest H. Britton
His Attorney.

Patented Jan. 2, 1951

2,536,827

UNITED STATES PATENT OFFICE 2,536,827

BRUSH MECHANISM

Charles A. Thomas, Fort Wayne, Ind., assignor to General Electric Company, a corporation of New York Application January 20, 1950, Serial No. 139,596

5 Claims. (Cl. 171—324)

1

This invention relates to brush mechanisms for dynamoelectric machines and more particularly to cartridge-type brush mechanisms having means for preventing brush chattering.

In the design of the brush mechanisms for dynamoelectric machines, particularly cartridge-type brush holder assemblies for motors of fractional horsepower frame sizes, it is desirable to provide means for preventing chattering of the brush in the holder since chattering substantially reduces brush life and produces inferior commutation.

An object of this invention is to provide an improved brush mechanism.

Another object of this invention is to provide an improved cartridge-type brush mechanism with means for reducing brush chattering.

A further object of this invention is to provide an improved cartridge-type brush mechanism with means for reducing brush chattering which is suitable for either direction of commutator rotation.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with this invention, there is provided a cartridge-type brush holder tube having a longitudinal slot formed therein for guiding a brush for longitudinal movement toward a current collector. A transverse slot is formed in the wall of the tube communicating with the longitudinal slot. A spring member surrounds the tube in the plane of the transverse slot and is provided with a portion arranged in the transverse slot. A roller is mounted on the slot portion of the spring member and is adapted to engage the side of the brush exposed by the transverse slot to apply sidewise pressure on the brush so as to resiliently urge the brush against a side of the longitudinal slot to prevent chattering.

In the drawing:

Fig. 1 is a side elevational view, partly in section, illustrating the preferred embodiment of the invention; Fig. 2 is a cross sectional view taken along the line 2—2 of Fig. 1; and Fig. 3 is a cross section view in the same plane as Fig. 2 illustrating a modification of this invention.

Referring now to Figs. 1 and 2, there is shown a cartridge type brush holder tube 1, formed of

2 conductive material, having a longitudinally extending brush slot 2 formed therein. A contact brush member 3, formed of any suitable material, is arranged for longitudinal movement in the slot 2 toward a current collector member 4. A cap 5 threadingly engages the end of the brush holder tube 1 remote from the current collector 4, as at 6, and a coil spring 7 is held in compression between the cap member 5 and the end of the brush 3 remote from the current collector 4 serving to resiliently urge the brush toward the current collector. The conductive brush tube 1 may be mounted in a suitable opening 8 in a dynamoelectric machine frame portion 9 by an insulating sleeve member 10 formed of suitable material, such as neoprene.

In order to minimize chattering of the brush 3 in the longitudinal slot 2, the arrangement now to be described is provided. A transverse slot 11 is formed in the wall of the brush holder tube 1 extending inwardly to communicate with the longitudinal slot 2. A spring member 12 is provided having a coiled portion 13 arranged in a circumferential groove 14 in the plane of the longitudinal slot 11 so as to circumferentially engage the brush holder tube 1. The spring member 12 is also provided with a straight portion 15 arranged in the longitudinal slot 11 and a roller 16, formed of suitable material such as glass, is rotatably mounted thereon. The roller 16 is adapted to engage the side 17 of the brush 3 exposed by the transverse slot 11 so as to apply sidewise pressure against the brush 2 to resiliently urge the brush against sides 18 of the longitudinal slot 2. The end 19 of the coiled portion 13 of the spring member 12 is detachably secured to the end 20 of the straight portion 15, as at 21, in order to permit removal of the spring and roller assembly. It will be noted that the roller 16 will enter the longitudinal slot 2 only a limited amount when the brush 3 is removed since the straight portion 15 of the spring member 12 will engage the bottom portions 22 of the longitudinal slot 11; thus the brush 2 can be replaced without requiring removal of the spring and roller assembly. It will now be readily apparent that this construction provides a simple and inexpensive means for biasing the brush against the side of the brush slot to prevent chattering in which the spring member 12 not only serves to resiliently bias the brush against the side of the brush slot but also provides its own support by circumferentially engaging the brush holder tube. Furthermore, brushes of the conventional type are used in this mechanism.

A further feature of this improved anti-chatter brush mechanism is the fact that it is suitable for either direction of cummutator rotation.

Referring now to Fig. 3 in which like parts are indicated by like reference numerals, a spring member 23 is provided having a resilient engaging portion 24 and a straight portion 25. The engaging portion 24 surrounds the brush tube 1 and is positioned by the circumferential groove 14 in the plane of the transverse slot 11. The roller 16 is rotatably mounted on the straight portion 25 and engages the exposed side 17 of the brush 3 to resiliently urge the brush against sides 18 of the longitudinal slot 2, in the manner disclosed in connection with Figs. 1 and 2.

While I have illustrated and described particular embodiments of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of my invention.

What I claim as new and desire to secure by Letters Patent of the United States is:

1. In combination with a cartridge-type brush holder tube having a longitudinal slot formed therein for guiding a brush for longitudinal movement toward a current collector and a transverse slot formed in the wall of said tube communicating with said longitudinal slot, resilient means circumferentially engaging said tube and having a portion arranged in said transverse slot adapted to apply pressure on the side of said brush exposed by said transverse slot whereby said brush is resiliently urged against a side of said longitudinal slot for preventing chattering.

2. In combination with a cartridge-type brush holder tube having a longitudinal slot formed therein for guiding a brush for longitudinal movement toward a current collector and a transverse slot formed in the wall of said tube communicating with said longitudinal slot, spring means surrounding and engaging said tube in the plane of said transverse slot and having a portion arranged in said transverse slot, and means on said slot portion of said spring adapted to engage the side of said brush exposed by said transverse slot for applying pressure on said brush whereby said brush is resiliently urged against a side of said longitudinal slot for preventing chattering.

3. In combination with a cartridge-type brush holder tube having a longitudinal slot formed therein for guiding a brush for longitudinal movement toward a current collector and a transverse slot formed in the wall of said tube communicating with said longitudinal slot, spring means including a portion circumferentially engaging said tube in the plane of said transverse slot and another portion arranged in said transverse slot and a roller rotatably mounted on said slot portion of said spring adapted to engage the side of said transverse slot for applying sidewise pressure on said brush whereby said brush is resiliently urged against a side of said longitudinal slot for preventing chattering.

4. In combination with a cartridge-type brush holder tube having a longitudinal slot formed therein for guiding a brush for longitudinal movement toward a current collector and a transverse slot formed in the wall of said tube communicating with said longitudinal slot, spring means including a coiled portion circumferentially engaging said tube in the plane of said transverse slot and a straight portion arranged in said slot, and a roller rotatably mounted on said straight portion of said spring adapted to engage the side of said brush exposed by said transverse slot for applying sidewise pressure on said brush whereby said brush is resiliently urged against a side of said longitudinal slot for preventing chattering.

5. In combination with a cartridge-type brush holder tube having a longitudinal slot formed therein for guiding a brush for longitudinal movement toward a current collector and a transverse slot formed in the wall of said tube communicating with said longitudinal slot, spring means including a portion circumferentially engaging said tube in the plane of said transverse slot and another portion arranged in said transverse slot, means on said slot portion of said spring adapted to engage the side of said brush exposed by said transverse slot for applying sidewise pressure on said brush whereby said brush is resiliently urged against a side of said longitudinal slot for preventing chattering, and means for detachably securing an end of said slot portion of said spring to an end of said embracing portion of said spring whereby said spring means can be removed.

CHARLES A. THOMAS.

REFERENCES CITED

The following references are of record in the file of this patent:

UNITED STATES PATENTS

| Number | Name | Date |
| --- | --- | --- |
| 426,471 | Rice | Apr. 29, 1890 |

FOREIGN PATENTS

| Number | Country | Date |
| --- | --- | --- |
| 207,162 | Germany | Feb. 15, 1909 |
| 537,321 | Germany | Nov. 2, 1931 |